US008549559B2

(12) United States Patent
Tsuji et al.

(10) Patent No.: US 8,549,559 B2

(45) Date of Patent: Oct. 1, 2013

(54) INFORMATION PROCESSING APPARATUS AND INFORMATION PROCESSING METHOD, AND PROGRAM

(75) Inventors: Tomohiro Tsuji, Kanagawa (JP); Akitsugu Tsuchiya, Tokyo (JP); Motoyuki Suzuki, Kanagawa (JP)

(73) Assignee: Sony Corporation (JP)

( * ) Notice: Subject to any disclaimer, the term of this patent is extended or adjusted under 35 U.S.C. 154(b) by 1317 days.

(21) Appl. No.: 11/359,838

(22) Filed: Feb. 22, 2006

(65) Prior Publication Data

US 2006/0206819 A1 Sep. 14, 2006

(30) Foreign Application Priority Data

Feb. 22, 2005 (JP) ................................ P2005-045933

(51) Int. Cl.
*G06F 3/00* (2006.01)
*G06F 13/00* (2006.01)
*H04N 5/445* (2011.01)

(52) U.S. Cl.
USPC .................. 725/37; 725/39; 725/40; 725/44; 725/45; 725/46; 725/47; 715/700

(58) Field of Classification Search
USPC .................. 725/47, 92, 37, 39, 40, 44, 45, 46
See application file for complete search history.

(56) References Cited

U.S. PATENT DOCUMENTS

2003/0046699 A1* 3/2003 Nonomura et al. ............. 725/58
2003/0093790 A1* 5/2003 Logan et al. .................... 725/38
2005/0160461 A1* 7/2005 Baumgartner et al. ......... 725/52
2005/0220440 A1* 10/2005 Liebhold ......................... 386/68
2006/0083484 A1* 4/2006 Wada et al. ..................... 386/83
2010/0031193 A1* 2/2010 Stark et al. .................... 715/810

FOREIGN PATENT DOCUMENTS

JP 11-252494 A 9/1999
JP 2000-138886 A 5/2000
JP 2000-250679 A 9/2000
JP 2000-331422 A 11/2000
JP 2002-230946 A 8/2002
JP 2003-045165 A 2/2003
JP 2003-257158 A 9/2003
JP 2004-046796 A 2/2004
JP 2004-297493 A 10/2004
JP 2004-343520 A 12/2004
JP 2005-032315 A 2/2005

* cited by examiner

*Primary Examiner* — Nasser Goodarzi
*Assistant Examiner* — Kyu Chae
(74) *Attorney, Agent, or Firm* — Lerner, David, Littenberg, Krumholz & Mentlik, LLP

(57) ABSTRACT

A playlist generating section generates a playlist by grouping a plurality of pieces of program information based on meta information stored in a database. Also, the playlist generating section generates the playlist by further including, in the playlist, current status information indicating a reproduction status of the playlist and changed status information indicating an update status of the plurality of pieces of the program information corresponding to the playlist. A display unit displays an image based on the playlist such that information representing the current status and the changed status is further included in the image based on the playlist for allowing selection of the playlist. As a result, it is possible to select a program desired by a user by a simple operation.

8 Claims, 15 Drawing Sheets

| CURRENT STATUS | CHANGED STATUS | 「PROGRAM ADDITION (RECORDING)」 | 「PROGRAM REPRODUCTION」 | 「PROGRAM DELETION」 |
|---|---|---|---|---|
| UNREPRODUCED | NEW (#1) | (#2)(UNREPRODUCED, UPDATED) | (#4)(BEING REPRODUCED, NONE) (#6)(REPRODUCED,NONE) | (#2)(UNREPRODUCED, UPDATED) |
| | UPDATED(#2) | (#2)(UNREPRODUCED, UPDATED) | (#4)(BEING REPRODUCED, NONE) (#6)(REPRODUCED,NONE) | (#2)(UNREPRODUCED, UPDATED) |
| | (NONE) | (DOES NOT OCCUR AS STATUS) | | |
| BEING REPRODUCED | NEW | (DOES NOT OCCUR AS STATUS) | | |
| | UPDATED(#3) | (#3)(BEING REPRODUCED, UPDATED) | (#4)(BEING REPRODUCED, NONE) (#6)(REPRODUCED,NONE) | (#3)(BEING REPRODUCED, UPDATED) (#5)(REPRODUCED,UPDATED) |
| | (NONE)(#4) | (#3)(BEING REPRODUCED, UPDATED) | (#4)(BEING REPRODUCED, NONE) (#6)(REPRODUCED,NONE) | (#3)(BEING REPRODUCED, UPDATED) (#5)(REPRODUCED,UPDATED) |
| REPRODUCED | NEW | (DOES NOT OCCUR AS STATUS) | | |
| | UPDATED(#5) | (#3)(BEING REPRODUCED, UPDATED) | (#6)(REPRODUCED,NONE) | (#5)(REPRODUCED,UPDATED) |
| | (NONE)(#6) | (#3)(BEING REPRODUCED, UPDATED) | (#6)(REPRODUCED,NONE) | (#5)(REPRODUCED,UPDATED) |

PERSONAL COMPUTER
12
CPU
51
ROM
52
RAM
53
INTERNAL BUS
54
INPUT-OUTPUT INTERFACE
55
INPUT UNIT
56
DISPLAY UNIT
57
SPEAKER
58
STORAGE UNIT
59
COMMUNICATION UNIT
60
BROADCAST RECEIVING UNIT
61
DRIVE
71
REMOVABLE MEDIUM
81

DB
103
PROGRAM INFORMATION
121-1
PROGRAM INFORMATION
121-2
PROGRAM INFORMATION
121-n
PLAYLIST
122
REPRODUCTION HISTORY
123
RETRIEVAL CONDITION
131
RETRIEVAL HISTORY
132
RETRIEVAL COUNT
133
PLAYLISTING CONDITION
134
DISPLAY CONDITION
135
MAIN CONTROL UNIT
101
PLAYLIST GENERATION PROCESSING UNIT
111
ORDER CONTROLLING UNIT
112
SPEAKER
58
DISPLAY UNIT
57
OPERATION INPUT UNIT
102
BROADCAST RECEIVING UNIT
61
12

FIG. 6

| STATUS TYPE | DETAILS |
| --- | --- |
| CURRENT STATUS | INCLUDES THREE STATUSES "UNREPRODUCED", "BEING REPRODUCED", AND "REPRODUCED", AND INDICATES STATE OF VIEWING OF PROGRAMS IN PLAYLIST BY USER |
| CHANGED STATUS | INDICATES CHANGE IN CONTENTS OF PROGRAMS OF PLAYLIST WHICH CHANGE RESULTS FROM DB INFORMATION UPDATE OR OPERATION BY USER |

FIG. 7

<CURRENT STATUS>

| STATUS | DETAILS |
| --- | --- |
| UNREPRODUCED | STATUS IN WHICH NO PROGRAMS IN PLAYLIST HAVE BEEN REPRODUCED |
| BEING REPRODUCED | STATUS IN WHICH ONE OR MORE PROGRAMS OF PROGRAMS IN PLAYLIST HAVE NOT BEEN REPRODUCED AND WHICH STATUS IS NOT "UNREPRODUCED" STATUS |
| REPRODUCED | STATUS IN WHICH ALL PROGRAMS IN PLAYLIST HAVE BEEN REPRODUCED |

FIG. 8

<CHANGED STATUS>

| STATUS | DETAILS |
| --- | --- |
| NEW | STATUS IN WHICH PLAYLIST HAS BEEN NEWLY CREATED AND PROGRAMS IN PLAYLIST HAVE NOT YET BEEN REPRODUCED AFTER CREATION OF PLAYLIST |
| UPDATE | STATUS IMMEDIATELY AFTER CONTENTS OF LIST OF PROGRAMS IN PLAYLIST ARE CHANGED BY DB INFORMATION UPDATE OR USER OPERATION IN WHICH STATUS PROGRAMS IN PLAYLIST HAVE NOT BEEN REPRODUCED BY USER AFTER CHANGING OF CONTENTS |
| NONE | STATUS OTHER THAN ABOVE TWO STATUSES. IN THIS STATUS, STATUS DISPLAY IS NOT MADE IN LIST OF PLAYLISTS |

FIG. 9

| CURRENT STATUS | CHANGED STATUS | 「PROGRAM ADDITION (RECORDING)」 | 「PROGRAM REPRODUCTION」 | 「PROGRAM DELETION」 |
| --- | --- | --- | --- | --- |
| UNREPRODUCED | NEW (#1) | (#2)(UNREPRODUCED, UPDATED) | (#4)(BEING REPRODUCED, NONE)<br>(#6)(REPRODUCED,NONE) | (#2)(UNREPRODUCED, UPDATED) |
| | UPDATED(#2) | (#2)(UNREPRODUCED, UPDATED) | (#4)(BEING REPRODUCED, NONE)<br>(#6)(REPRODUCED,NONE) | (#2)(UNREPRODUCED, UPDATED) |
| | (NONE) | (DOES NOT OCCUR AS STATUS) | | |
| BEING REPRODUCED | NEW | (DOES NOT OCCUR AS STATUS) | | |
| | UPDATED(#3) | (#3)(BEING REPRODUCED, UPDATED) | (#4)(BEING REPRODUCED, NONE)<br>(#6)(REPRODUCED,NONE) | (#3)(BEING REPRODUCED, UPDATED)<br>(#5)(REPRODUCED,UPDATED) |
| | (NONE)(#4) | (#3)(BEING REPRODUCED, UPDATED) | (#4)(BEING REPRODUCED, NONE)<br>(#6)(REPRODUCED,NONE) | (#3)(BEING REPRODUCED, UPDATED)<br>(#5)(REPRODUCED,UPDATED) |
| REPRODUCED | NEW | (DOES NOT OCCUR AS STATUS) | | |
| | UPDATED(#5) | (#3)(BEING REPRODUCED, UPDATED) | (#6)(REPRODUCED,NONE) | (#5)(REPRODUCED,UPDATED) |
| | (NONE)(#6) | (#3)(BEING REPRODUCED, UPDATED) | (#6)(REPRODUCED,NONE) | (#5)(REPRODUCED,UPDATED) |

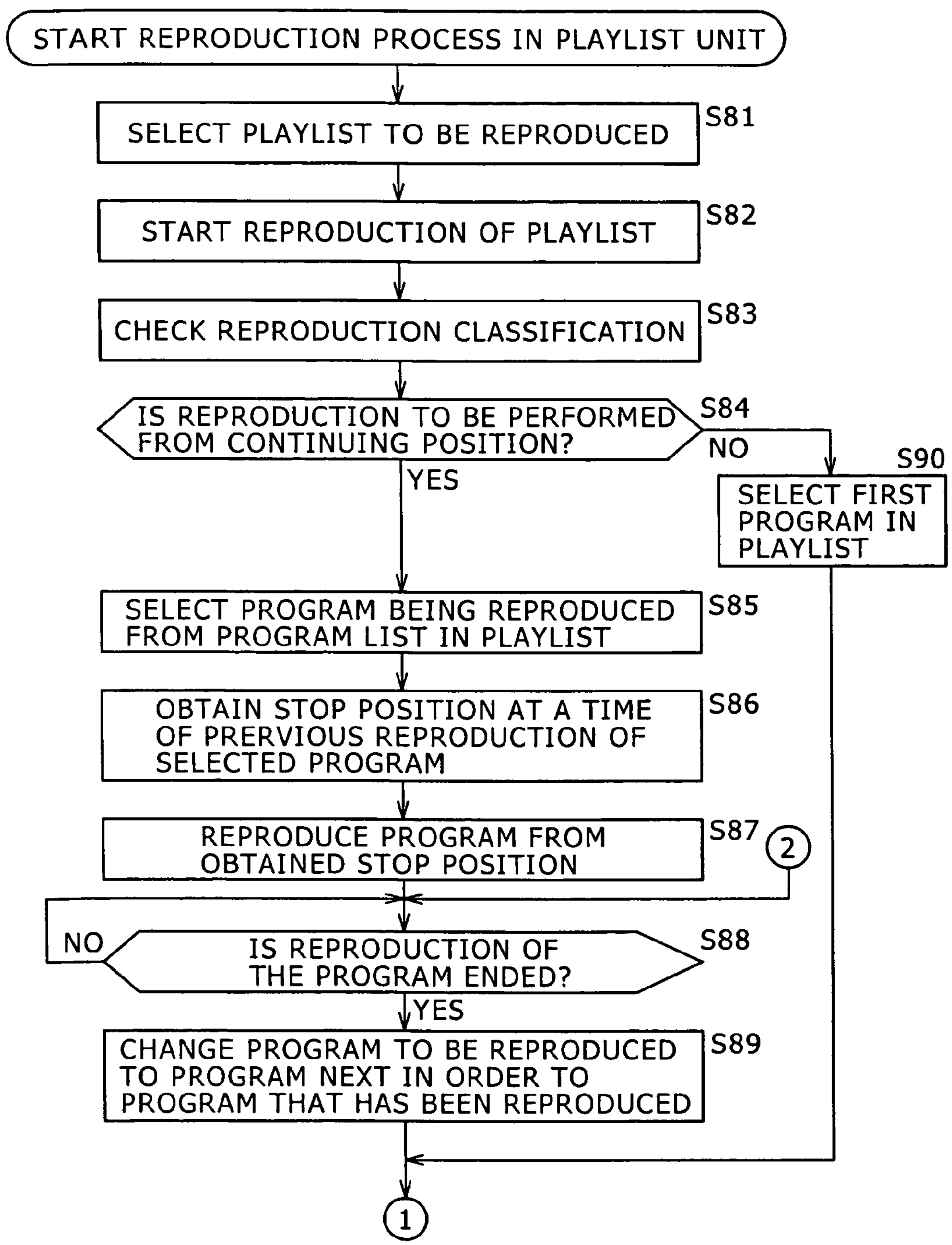
FIG. 15
START REPRODUCTION PROCESS IN PLAYLIST UNIT
SELECT PLAYLIST TO BE REPRODUCED
S81
START REPRODUCTION OF PLAYLIST
S82
CHECK REPRODUCTION CLASSIFICATION
S83
IS REPRODUCTION TO BE PERFORMED FROM CONTINUING POSITION?
S84
NO
YES
SELECT FIRST PROGRAM IN PLAYLIST
S90
SELECT PROGRAM BEING REPRODUCED FROM PROGRAM LIST IN PLAYLIST
S85
OBTAIN STOP POSITION AT A TIME OF PRERVIOUS REPRODUCTION OF SELECTED PROGRAM
S86
REPRODUCE PROGRAM FROM OBTAINED STOP POSITION
S87
2
NO
IS REPRODUCTION OF THE PROGRAM ENDED?
S88
YES
CHANGE PROGRAM TO BE REPRODUCED TO PROGRAM NEXT IN ORDER TO PROGRAM THAT HAS BEEN REPRODUCED
S89
1

INFORMATION PROCESSING APPARATUS AND INFORMATION PROCESSING METHOD, AND PROGRAM

CROSS-REFERENCE TO RELATED APPLICATIONS

The present application claims priority from Japanese Patent Application No. JP 2005-045933 filed on Feb. 22, 2005, the disclosure of which is hereby incorporated by reference herein.

BACKGROUND OF THE INVENTION

The present invention relates to an information processing apparatus and an information processing method, and a program, and particularly to an information processing apparatus and an information processing method, and a program that enable a program desired by a user to be selected by a simple operation.

Recently, with the spread of recording and reproducing devices such as hard disk recorders, DVD (Digital Versatile Disk) recorders and the like having a high-capacity storage area, the number of programs (contents) recorded in a recording and reproducing device by a user has been increasing.

In addition, there are recording and reproducing devices that have a function of recording programs on the basis of the preferences of a user and have a function of recording programs of a plurality of channels simultaneously, so that even programs not clearly specified by the user may be recorded automatically.

Further, for example, a recording and reproducing device has been developed which is programmed to record automatically a program having broadcast contents with continuity to broadcast contents of a recorded program. A recording and reproducing device is disclosed in Japanese Patent Laid-Open No. Hei 11-252494.

However, though these recording and reproducing devices record programs on the basis of the preferences of a user or a command from a user, the recording and reproducing devices record programs not intended by the user, so that programs desired by the user are not recorded in some cases. In addition, even when programs desired by the user are recorded, it is difficult to retrieve the desired programs from a plurality of recorded programs.

SUMMARY OF THE INVENTION

The present invention enables a program desired by a user to be selected by a simple operation.

According to an embodiment of the present invention, there is provided an information processing apparatus for processing program information as information of programs, the information processing apparatus including a storing section operable to store the program information; a playlist generating section operable to generate a playlist by grouping a plurality of pieces of the stored program information based on information descriptive of the stored program information, the descriptive information being included in the program information, and by associating the plurality of pieces of program information with one list for associating the plurality of the grouped pieces of program information with each other and reproducing the plurality of the grouped pieces of program information; and a display controlling section operable to control display of an image based on the playlist, the image allowing selection of the playlist; wherein the playlist generating section generates the playlist by further including, in the playlist, first status information indicating a reproduction status of the playlist and second status information indicating an update status of the plurality of pieces of program information corresponding to the playlist, and the display controlling section controls the display of the image based on the playlist such that information representing the first status information and the second status information is further included in the image based on the playlist.

The information processing apparatus can further include a sorting section operable to change an order of the plurality of pieces of program information corresponding to the playlist based on the descriptive information of each of the plurality of pieces of program information corresponding to the playlist, wherein, when a command is given to display the plurality of pieces of program information corresponding to the playlist, the display controlling section controls the display of an image based on the program information, the image allowing a command to be given to reproduce the program information in the order of the plurality of pieces of program information, the order being changed by the sorting section.

The information processing apparatus can further include an operation input receiving section operable to receive an operation input for selecting the playlist from a user; and a storing controlling section operable to control storage in the storage section of a retrieval condition representing a condition for selecting the playlist, a retrieval history representing a history of retrieval of the playlist, and a retrieval count representing a number of retrievals of the playlist based on the descriptive information of each of the plurality of pieces of program information corresponding to the playlist selected by the operation input; wherein the playlist generating section can generate the playlist based on the retrieval condition, the retrieval history, the retrieval count and the descriptive information of the program information stored in the storing section.

The storing controlling section can convert the retrieval condition, the retrieval history, and the retrieval count into an XML (Extensible Markup Language) format, and store the retrieval condition, the retrieval history, and the retrieval count in the storing section.

The information processing apparatus can further include a reproducing section operable to continuously reproduce the plurality of pieces of program information corresponding to the playlist.

According to an embodiment of the present invention, there is provided an information processing method including storing program information as information of programs; generating a playlist by grouping a plurality of pieces of the stored program information based on information descriptive of the stored program information, the descriptive information being included in the program information, and by associating the plurality of pieces of program information with one list for associating the plurality of the grouped pieces of program information with each other and reproducing the plurality of the grouped pieces of program information; and controlling display of an image based on the playlist, the image allowing selection of the playlist; wherein the playlist generating step includes generating the playlist by further including, in the playlist, first status information indicating a reproduction status of the playlist and second status information indicating an update status of the plurality of pieces of program information corresponding to the playlist, and the display controlling step includes controlling the display of the image based on the playlist such that information representing the first status information and the second status information is further included in the image based on the playlist.

According to an embodiment of the present invention, there is provided a program for making a computer perform an information processing method, the method including storing program information as information of programs; generating a playlist by grouping a plurality of pieces of the stored program information based on information descriptive of the stored program information, the descriptive information being included in the stored program information, and by associating the plurality of pieces of program information with one list for associating the plurality of the grouped pieces of program information with each other and reproducing the plurality of the grouped pieces of program information; and controlling display of an image based on the playlist, the image allowing selection of the playlist; wherein the playlist generating step includes generating the playlist by further including, in the playlist, first status information indicating a reproduction status of the playlist and second status information indicating an update status of the plurality of pieces of program information corresponding to the playlist, and the display controlling step includes controlling the display of the image based on the playlist such that information representing the first status information and the second status information is further included in the image based on the playlist.

In the present invention, a playlist is generated by grouping a plurality of pieces of program information based on information descriptive of the program information stored in a storing section, the descriptive information being included in the program information, and displaying an image allowing selection of the playlist. Also, the image allowing the selection of the playlist is displayed such that a reproduction status of the playlist and an update status of the plurality of pieces of program information corresponding to the playlist are included in the image.

According to the present invention, it is possible to select a program desired by a user. In particular, according to the present invention, it is possible to select a program desired by a user by a simple operation. It is also possible to select a playlist in which a plurality of programs are grouped.

BRIEF DESCRIPTION OF THE DRAWINGS

FIG. 6 is a diagram of assistance in explaining a current status and a changed status;

FIG. 7 is a diagram of assistance in explaining details of the current status;

FIG. 8 is a diagram of assistance in explaining details of the changed status;

FIG. 9 is a diagram of assistance in explaining transitions of the current status and the changed status;

FIG. 15 is a flowchart of assistance in explaining a reproduction process in a playlist unit.

DETAILED DESCRIPTION

Preferred embodiments of the present invention will hereinafter be described with reference to the drawings.

Figure 1:
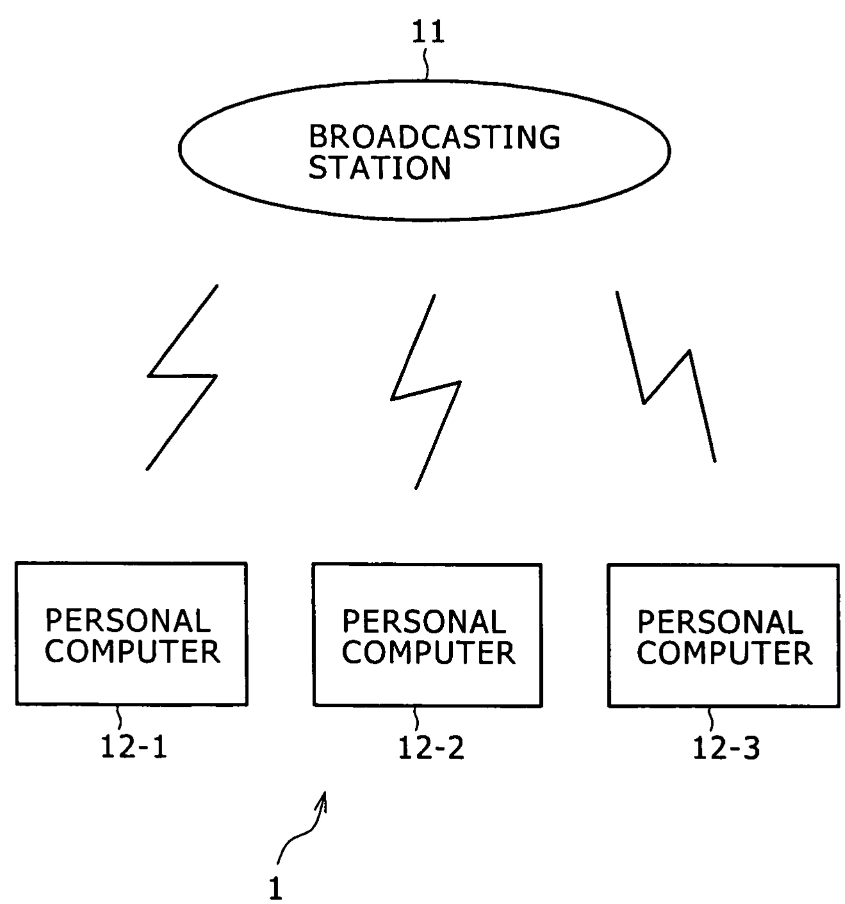
FIG. 1 is a diagram showing an example of general configuration of a program providing system to which the present invention is applied.

FIG. 1 is a diagram showing an example of general configuration of a program providing system 1 to which the present invention is applied.

As shown in FIG. 1, the program providing system 1 has a broadcasting station 11 and personal computers 12-1 to 12-3. Incidentally, while one broadcasting station 11 is provided in the example of FIG. 1, an arbitrary number of stations may be provided. Also, while the number of personal computers 12-1 to 12-3 in the example of FIG. 1 is three, an arbitrary number of personal computers may be provided. When the personal computers 12-1 to 12-3 do not need to be individually distinguished from each other, the personal computers 12-1 to 12-3 will hereinafter be referred to as a personal computer 12.

The broadcasting station 11 is assigned a predetermined channel (frequency). The broadcasting station 11 transmits (broadcasts) a radio wave of a digital broadcast using the channel assigned to the broadcasting station 11. The radio wave of the digital broadcast includes program information (a video signal and an audio signal) constituting a program as well as meta information descriptive of the program. The personal computer 12 receives the radio wave of the digital broadcast transmitted (broadcast) from the broadcasting station 11, and records or reproduces the program on the basis of the program information and the meta information.

Figure 2:
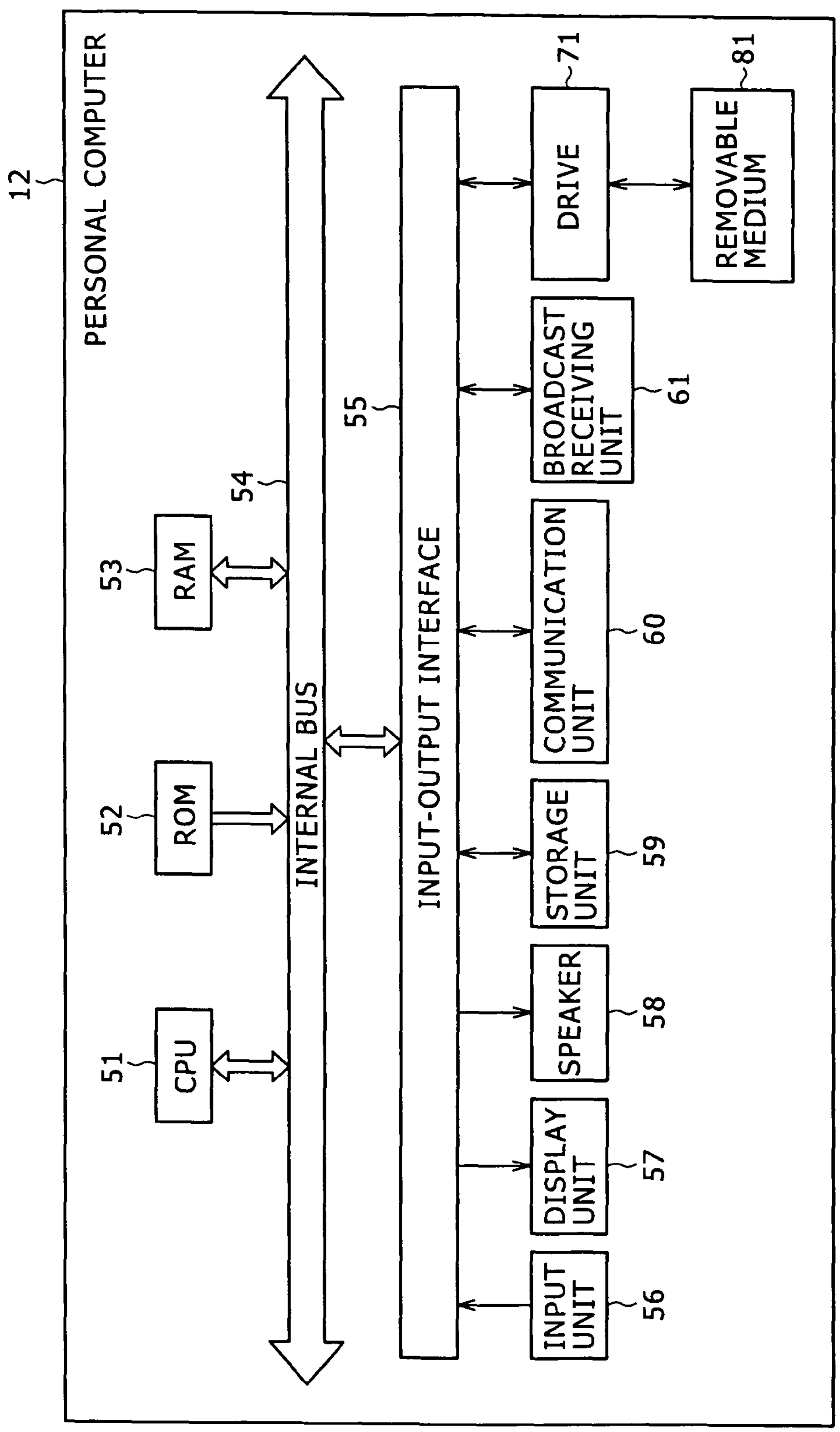
FIG. 2 is a block diagram showing an example of configuration of hardware of a personal computer in FIG. 1.

FIG. 2 is a block diagram showing an example of configuration of hardware of the personal computer 12 in FIG. 1.

A CPU (Central Processing Unit) 51, a ROM (Read Only Memory) 52, and a RAM (Random Access Memory) 53 are interconnected via an internal bus 54. The internal bus 54 is also connected with an input-output interface 55.

The CPU 51 performs various processes according to a program stored in the ROM 52 or a program loaded from a storage unit 59 into the RAM 53. The RAM 53 also stores data and the like necessary for the CPU 51 to perform various processes as appropriate.

The input-output interface 55 is connected with an input unit 56 including a keyboard, a mouse or the like, a display unit 57 including an LCD (Liquid Crystal Display), a CRT (Cathode Ray Tube) or the like, a speaker 58, a storage unit 59 including a hard disk and the like, a communication unit 60 including a modem, a terminal adapter and the like, and a broadcast receiving unit 61. The communication unit 60 performs a communication process via various networks including a telephone network or CATV. The broadcast receiving unit 61 extracts program information by receiving a radio wave broadcast by the broadcasting station 11 and performing a predetermined process, and supplies the program information to the CPU 51 via the input-output interface 55 and the internal bus 54.

The input-output interface 55 is also connected with a drive 71 as required. A removable medium 81 formed by a magnetic disk, an optical disk, a magneto-optical disk, a semiconductor memory or the like is loaded into the drive 71 as required. A computer program read from the removable medium 81 is installed into the storage unit 59 as required.

Figure 3:
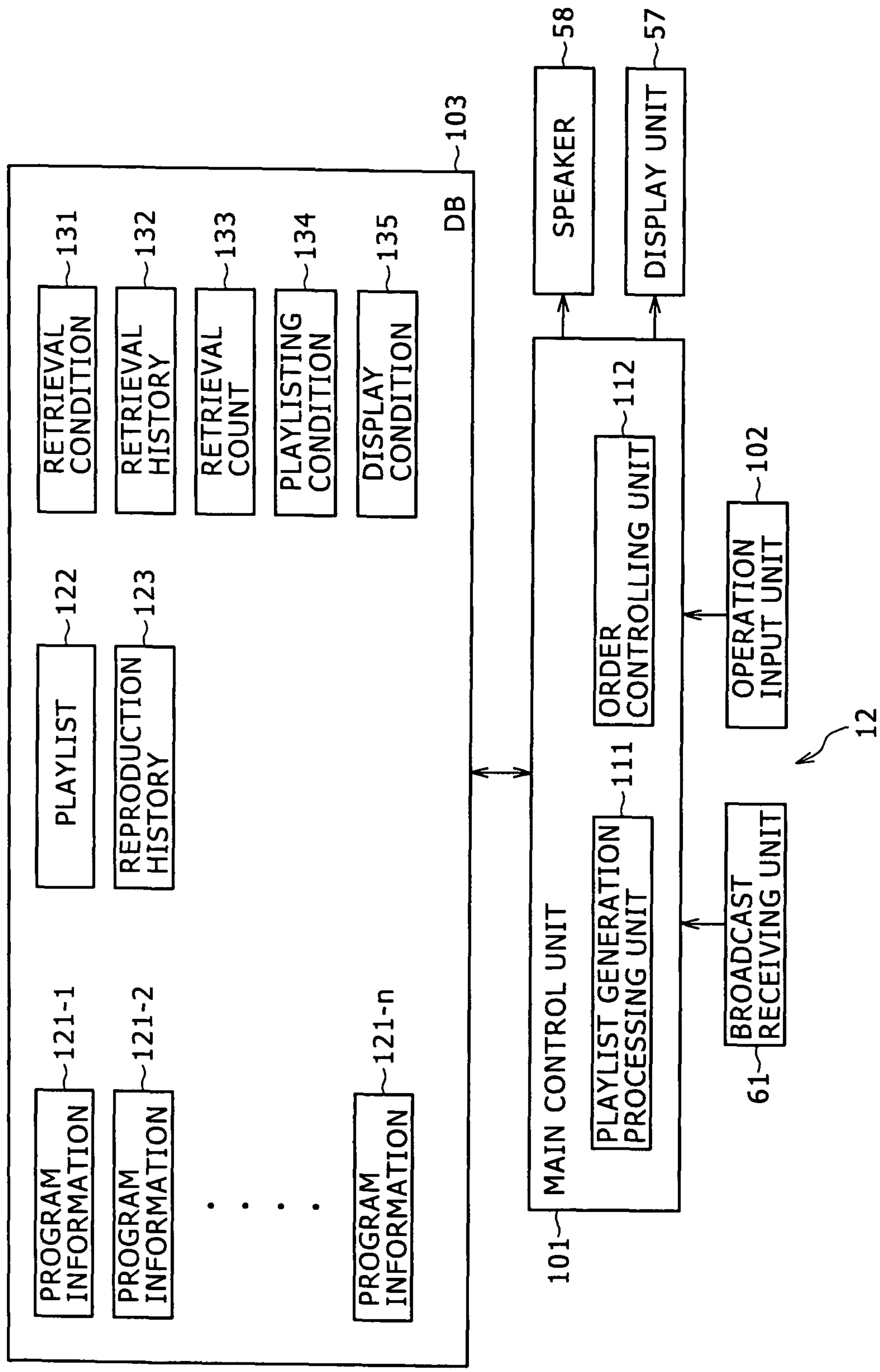
FIG. 3 is a block diagram showing an example of functional configuration of the personal computer in FIG. 2.

FIG. 3 is a block diagram of assistance in explaining an example of functional configuration of the personal computer 12 in FIG. 2.

The personal computer 12 in FIG. 3 includes a main control unit 101, an operation input unit 102, and a DB (database) 103 as well as the display unit 57, the speaker 58, and the broadcast receiving unit 61. The display unit 57, the speaker 58, and the broadcast receiving unit 61 are the same as the respective parts described in FIG. 2, and therefore description thereof will be omitted.

The main control unit 101 controls each part. For example, the main control unit 101 obtains program information from the broadcast receiving unit 61, and stores the program information in the DB 103. In addition, the main control unit 101 for example performs various processes on the basis of a command from a user which command is input to the operation input unit 102. Further, the main control unit 101 displays an image corresponding to a program specified to be displayed on the display unit 57, and outputs sound to the speaker 58. In addition, the main control unit 101 controls writing and reading (recording and reproduction) to and from the DB 103.

The main control unit 101 includes a playlist generation processing unit 111 and an order controlling unit 112. The playlist generation processing unit 111 performs processing related to playlists such as generating a playlist of recorded programs (that is, the information of programs stored in the DB 103 (program information)), and updating the playlist. The order controlling unit 112 controls the order of programs included in a playlist (changes the order of programs).

The operation input unit 102 receives an operation input from a user, and supplies a control signal corresponding to the received operation input to the main control unit 101.

Figure 4:
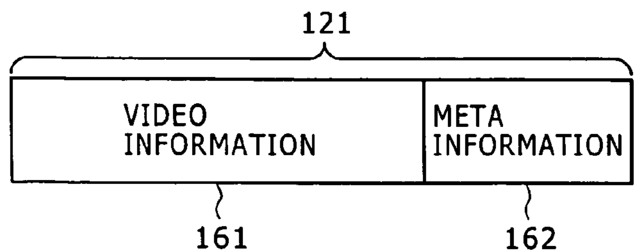
FIG. 4 is a diagram of assistance in explaining an example of program information.

Information related to programs is registered in the DB 103. For example, information for retrieving programs, information for grouping programs into a playlist, and information for displaying programs are registered in the DB 103. For example, pieces of program information 121-1 to 121-n (n is an arbitrary natural number), playlists 122, and a reproduction history 123 are registered in the DB 103. As shown in FIG. 4, the program information 121-1 includes video information 161 composed of image information and sound information, and meta information 162 descriptive of the program. A playlist 122 is a reproduction list for reproducing programs. That is, a playlist 122 is a reproduction list presented to a user. The meta information 162 includes the broadcast data and time of the program, the channel of the broadcasting station 11, a series, performers, a director and the like. The present embodiment registers a plurality of programs having continuity, programs having a same program name, or the like in one playlist. For example, a plurality of programs in a same genre may be included in one playlist. Specifically, in the case of a serial drama, programs (for example 10 programs) from a first installment to a last installment are grouped into one playlist. The reproduction history 123 is information on a history of programs reproduced in the personal computer 12. Incidentally, when the pieces of program information 121-1 to 121-n do not need to be individually distinguished from each other, the pieces of program information 121-1 to 121-n will hereinafter be referred to as program information 121.

The DB 103 also stores a retrieval condition 131, a retrieval history 132, a retrieval count 133, a playlisting condition 134, and a display condition 135. The retrieval condition 131 is a condition for selection of a desired playlist by a user from among a plurality of playlists. For example, the retrieval condition is a condition (item) for narrowing down a specific playlist from a plurality of playlists. The retrieval history 132 is a history of playlist retrieval by the user. The retrieval count corresponds to a retrieval condition, and indicates the number of times (frequency) that a playlist is retrieved under the retrieval condition. The playlisting condition 134 is a condition for grouping (integrating) a plurality of (related) programs. The display condition 135 is a condition when a plurality of programs included in a playlist are displayed. The information such as the retrieval condition 131, the retrieval history 132, the retrieval count 133 and the like is converted into an XML (Extensible Markup Language) format, and then stored in the DB 103. Specifically, the main control unit 101 converts the playlist retrieval condition, the playlist retrieval history, the playlist retrieval count and the like into the XML format on the basis of the meta information 162 (FIG. 4) included in the program information 121 and a command from the user via the operation input unit 102, and stores the results as the retrieval condition 131, the retrieval history 132, and the retrieval count 133 in the DB 103.

Figure 5:
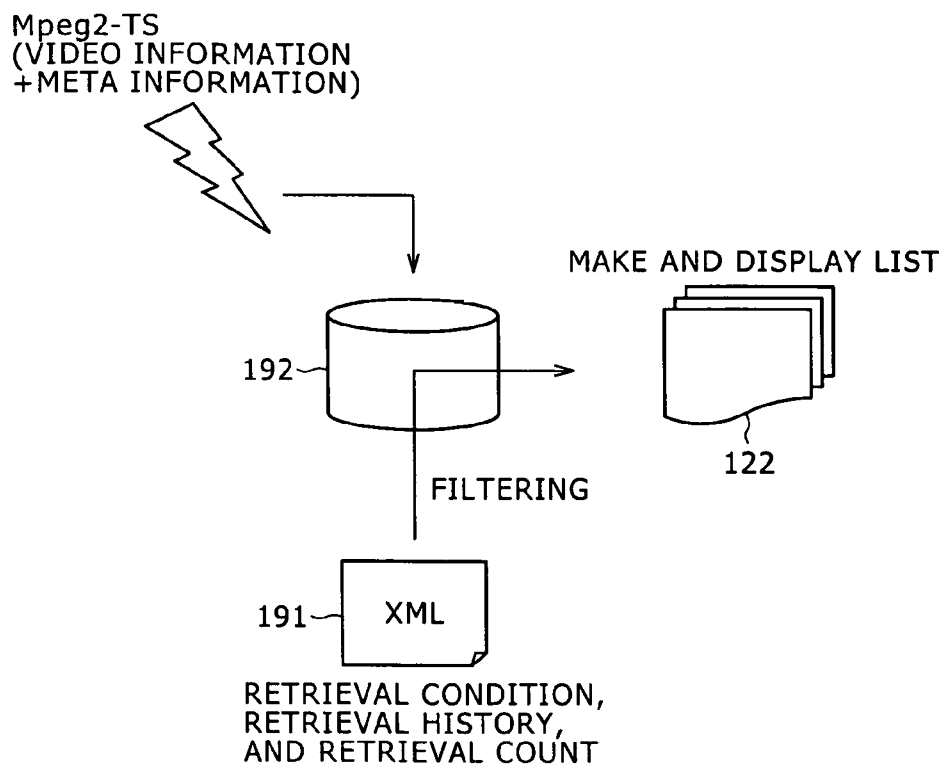
FIG. 5 is a diagram of assistance in explaining a method of listing program information.

The retrieval condition 131, the retrieval history 132, and the retrieval count 133 converted into the XML format are used when a playlist 122 is generated on the basis of recorded program information (that is, broadcast and received program information) as shown in FIG. 5. The program information 121 is received in an MPEG (Moving Picture Experts Group) 2-TS (Transport Stream) format, as shown in FIG. 5. A predetermined process is performed on received MPEG2-TS packets, and the result is stored as the program information 121 in a DB 192 (corresponding to the DB 103 in FIG. 3). Specifically, the broadcast receiving unit 61 in FIG. 3 receives data in the MPEG2-TS format, and performs a predetermined process on the data to convert the data into program information 121. The main control unit 101 stores the program information 121 in the DB 103.

The received MPEG2-TS data (program information) includes video information 161 and meta information 162, as described above with reference to FIG. 4. The playlist generation processing unit 111 of the main control unit 101 generates a playlist 122 by filtering a plurality of pieces of program information 121 on the basis of information (retrieval information 191 described as XML in FIG. 5) stored in the DB 103, and listing (grouping) pieces of program information 121. That is, the playlist generation processing unit 111 generates a playlist by associating a plurality of pieces of program information with one playlist (generates a playlist by grouping and integrating a plurality of pieces of program information into one). Then, the main control unit 101 stores the generated playlist 122 in the DB 103. Incidentally, in practice, the order of the plurality of programs listed as the playlist 122 is changed under control of the order controlling unit 112.

The status of the playlist 122 will next be described in more detail with reference to FIGS. 6 to 9.

As shown in FIG. 6, the playlist 122 has a "current status" and a "changed status". The current status indicates a state of viewing of programs within the playlist (that is, a plurality of programs included in one playlist) by the user. The changed status indicates how programs included in the playlist are changed when the change occurs.

In the case of a playlist of music files, for example, the contents of the playlist do not change dynamically. Therefore, a changed status is not required, and the state of the music files can be indicated by only a current status. However, the contents of a playlist of a plurality of programs are changed dynamically. Thus, providing a changed status in addition to a current status makes program management easier. As will be described later in detail, the status of playlists can be indicated concisely by displaying both the "current status" and the "changed status" when a list of playlists is displayed.

As the current status, there are three statuses "unreproduced", "being reproduced", and "reproduced", as shown in FIG. 7. "Unreproduced" indicates a status in which no programs within the playlist (programs included in the playlist) have been reproduced. "Being reproduced" indicates a status in which one or more programs of the programs in the playlist have not been reproduced and that is not the unreproduced status. For example, in a case where four programs are included in the playlist and three programs have been reproduced, one remaining program has not yet been reproduced. Thus, this case represents the "being reproduced" status. "Reproduced" denotes a status in which all the programs in the playlist have been reproduced. The current status including these statuses differs depending on a state of reproduction of the programs in the playlist by the user, and is a status indicating a state of reproduction of the playlist as a whole rather than the individual programs.

As the changed status, there are three statuses "new", "updated", and "none", as shown in FIG. 8. "New" represents a status in which the playlist has been newly created and programs in the playlist have not yet been reproduced after the creation of the playlist. "Updated" represents a status after the contents of a list of the programs in the playlist are changed by the updating of database (DB) information, a user operation, or the like in which status the programs in the playlist have not been reproduced by the user after the changing of the contents. "None" represents a status other than "new" and "updated". In this status, the changed status is not displayed in a list of playlists. Thus, the "changed status" of the playlist is determined by a change in the playlist when the DB information is updated by recording a new program, for example, and an operation by the user such as reproduction or deletion of a program.

Combinations of the "current status" and the "changed status" described with reference to FIG. 7 and FIG. 8 will next be described with reference to FIG. 9.

In FIG. 9, a status in which the current status of the playlist is "unreproduced" and the changed status of the playlist is "new" will be referred to as a "status #1", and represented by characters (#1) in parentheses in the figure. Similarly, a status in which the current status of the playlist is "unreproduced" and the changed status of the playlist is "updated" will be referred to as a "status #2", and represented by characters (#2) in parentheses in the figure. A status in which the current status of the playlist is "being reproduced" and the changed status of the playlist is "updated" will be referred to as a "status #3", and represented by characters (#3) in parentheses in the figure. A status in which the current status of the playlist is "being reproduced" and the changed status of the playlist is "none" will be referred to as a "status #4", and represented by characters (#4) in parentheses in the figure. A status in which the current status of the playlist is "reproduced" and the changed status of the playlist is "updated" will be referred to as a "status #5", and represented by characters (#5) in parentheses in the figure. A status in which the current status of the playlist is "reproduced" and the changed status of the playlist is "none" will be referred to as a "status #6", and represented by characters (#6) in parentheses in the figure.

Three statuses, that is, a status in which the current status of the playlist is "unreproduced" and the changed status of the playlist is "none", a status in which the current status of the playlist is "being reproduced" and the changed status of the playlist is "new", and a status in which the current status of the playlist is "reproduced" and the changed status of the playlist is "new" do not occur as a status.

When a program is added (recorded) in the "status #1" in which the current status of the playlist is "unreproduced" and the changed status of the playlist is "new", a transition is made to the "status #2" in which the current status of the playlist is "unreproduced" and the changed status of the playlist is "updated". When a program in the playlist is reproduced in the "status #1", the status of the playlist makes a transition to the "status #4" or the "status #6". Specifically, when a part of programs in the playlist are reproduced in the "status #1", the status of the playlist makes a transition to the "status #4". When all of the programs in the playlist are reproduced in the "status #1", the status of the playlist makes a transition to the "status #6". When a program in the playlist is deleted in the "status #1", the status of the playlist makes a transition to the "status #2".

Making brief description in the following, when a program is added to the playlist (recorded) in the "status #2", the status of the playlist makes a transition to the "status #2". When a program in the playlist is reproduced in the "status #2", the status of the playlist makes a transition to the "status #4" or the "status #6". When a program in the playlist is deleted in the "status #2", the status of the playlist makes a transition to the "status #2".

When a program is added to the playlist (recorded) in the "status #3", the status of the playlist does not make a transition and remains the "status #3". When a program in the playlist is reproduced in the "status #3", the status of the playlist makes a transition to the "status #4" or the "status #6". When a program in the playlist is deleted in the "status #3", the status of the playlist makes a transition to the "status #3" or the "status #5". Specifically, when a program in the playlist is deleted in the "status #3" and a program or programs in the playlist have not yet been reproduced, the status of the playlist makes a transition to the "status #3". When a program in the playlist is deleted in the "status #3" and all of the programs in the playlist have been reproduced, the status of the playlist makes a transition to the "status #5".

When a program is added to the playlist (recorded) in the "status #4", the status of the playlist makes a transition to the "status #3". When a program in the playlist is reproduced in the "status #4", the status of the playlist makes a transition to the "status #4" or the "status #6". When a program in the playlist is deleted in the "status #4", the status of the playlist makes a transition to the "status #3" or the "status #5".

When a program is added to the playlist (recorded) in the "status #5", the status of the playlist makes a transition to the "status #3". When a program in the playlist is reproduced in the "status #5", the status of the playlist makes a transition to the "status #6". When a program in the playlist is deleted in the "status #5", the status of the playlist remains the "status #5".

When a program is added to the playlist (recorded) in the "status #6", the status of the playlist makes a transition to the "status #3". When a program in the playlist is reproduced in the "status #6", the status of the playlist remains the "status #6". When a program in the playlist is deleted in the "status #6", the status of the playlist makes a transition to the "status #5".

Thus, each status of the playlist makes a transition when a new program is recorded or when a program is reproduced or deleted on the basis of a command from the user. By viewing a display showing such a status, the user can check the dynamic status of the playlist.

A process for displaying a list of playlists in the personal computer 12 of FIG. 3 will next be described with reference to a flowchart of FIG. 10. Incidentally, this process is started when the user inputs an operation command to display a list of playlists to the operation input unit 102 in FIG. 3.

In step S11, the operation input unit 102 receives a command to display a list of playlists from the user. The operation input unit 102 notifies this to the main control unit 101.

In step S12, the main control unit 101 determines whether the DB 103 is updated. The DB 103 is updated when new program information is added or when reproduction is performed, for example. When the main control unit 101 determines in step S12 that the DB 103 is not updated, the process proceeds to step S19, which step will be described later.

When the main control unit 101 determines in step S12 that the DB 103 is updated, the process proceeds to step S13, where the playlist generation processing unit 111 of the main control unit 101 generates a playlist 122 on the basis of the playlisting condition 134.

A detailed example of the playlist generated by the playlist generation processing unit 111 will be described. The playlist generation processing unit 111 generates the playlist by grouping a plurality of programs into one playlist on the basis of information included in the meta information (meta information 162 in FIG. 4) of program information 121 and the playlisting condition 134. As the playlisting condition 134, for example a condition of whether series_id is identical and a condition whether event_id is described within the event group descriptor of another program belonging to the playlist are set. The information included in the meta information (meta information 162 in FIG. 4) of the program information 121 is for example PSI (Program Specific Information) and EIT (Event Information Table) information in SI (Service Information) included in the broadcast wave of a digital broadcast. The playlist generation processing unit 111 generates the playlist by grouping a plurality of programs referring to the PSI and the EIT (the EIT of the SI) included in the meta information of the program information 121 and using the playlisting condition 134. For example, the playlist generation processing unit 111 determines that programs matching a condition set in the playlisting condition 134 belong to the same playlist (belong to one group), and groups the programs into one playlist. Thus, in the case of programs of a same series or even in the case of an incomplete plurality of programs recorded of a same program, it is possible to group the plurality of programs into one playlist.

The playlist generation processing unit 111 also generates a playlist on the basis of the retrieval condition 131, the retrieval history 132, and the retrieval count 133. The retrieval condition 131, the retrieval history 132, and the retrieval count 133 are the condition, history, and count (frequency) of the playlist retrieved by the user in the past, and are conditions representing the preferences of the user. The playlist generation processing unit 111 thus generates a playlist using the dynamic conditions representing the preferences of the user.

Figure 11:
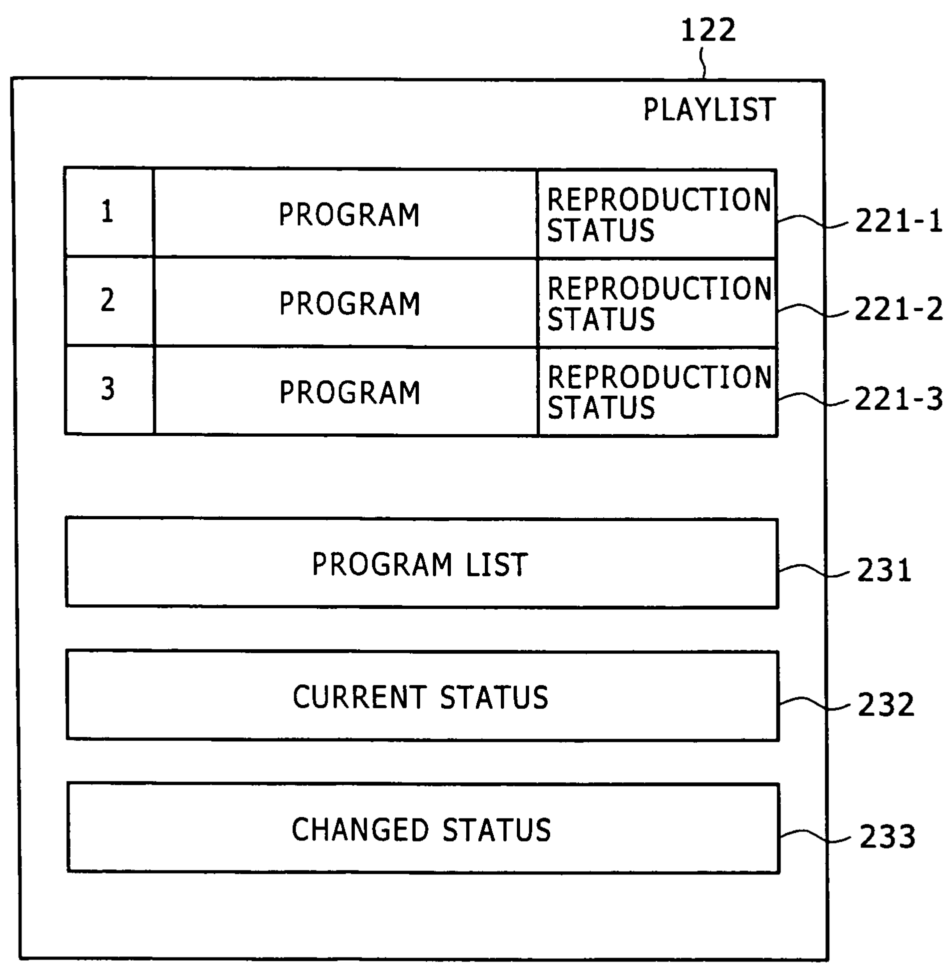
FIG. 11 is a diagram of assistance in explaining a playlist.

An example of the playlist 122 generated by the process of step S13 is shown in FIG. 11. The playlist 122 in FIG. 11 includes programs 221-1 to 221-3, a program list 231, a current status 232, and a changed status 233. The programs 221-1 to 221-3 are information for identifying the program information 121-1 to 121-3 in FIG. 3 described above. For example, IDs for identifying the respective pieces of program information 121-1 to 121-3 in FIG. 3 are the programs 221-1 to 221-3. The playlist 122 indicates that the programs identified by the playlist 122 include the programs presented by the program information 121-1 to 121-3. That is, the program information corresponding to the programs 221-1 to 221-3 is the program information 121-1 to 121-3. A reproduction status is associated as attached information with each of the programs 221-1 to 221-3.

The program list 231 is a list of programs included in the playlist 122. In the example of FIG. 11, a list of the programs 221-1 to 221-3 is the program list 231. The current status 232 is information indicating the current status of the playlist as described above with reference to FIG. 7 and FIG. 9. The changed status 233 is information indicating the changed status of the playlist as described above with reference to FIG. 8 and FIG. 9. Incidentally, the playlist 122 may include the program information itself rather than the programs 221-1 to 221-3.

When the playlist generation processing unit 111 generates a playlist 122 and there is duplicate program information resulting from a rebroadcast or the like in the program information registered in the DB 103, for example, the playlist generation processing unit 111 deletes the duplicate program information from the playlist 122, and deletes the program information from the DB 103. It is thereby possible to prevent the duplication of program information, and thus prevent unnecessary use of a storage area. In addition, the user can reproduce a program without caring about whether the program to be reproduced is a program broadcast for the first time or a rebroadcast program. Further, contents can be reproduced without repetition in time series.

Returning to FIG. 10, the main control unit 101 in step S14 obtains the program list 231 (FIG. 11) in the playlist 122 generated by the playlist generation processing unit 111.

In step S15, the main control unit 101 compares the program list 231 of the playlist 122 stored in the DB 103 with the program list 231 obtained in the process of step S14 to check for an increase or a decrease in the number of programs. That is, since the playlist 122 is stored in the DB 103 as shown in FIG. 3 as a result of a previous process of FIG. 10 or the like, the main control unit 101 compares the program list of this stored playlist with the program list 231 of the playlist (FIG. 11) obtained in the process of step S14 (that is, generated in the process of step S13) to check for an increase or a decrease in the number of programs.

In step S16, the main control unit 101 obtains the reproduction status of each program in the playlist. Specifically, the main control unit 101 obtains the reproduction status associated with each of the programs 221-1 to 221-3 included in the playlist 122 of FIG. 11 which playlist is generated by the process of step S13.

In step S17, the main control unit 101 sets the current status and the changed status of the playlist 122 on the basis of the reproduction status of each program which status is obtained by the process of step S16. That is, the main control unit 101 sets the current status and the changed status of the playlist 122 on the basis of the reproduction status of each program and FIGS. 6 to 8. Incidentally, when a plurality of playlists are generated by the process of step S13, the main control unit 101 sets the current statuses and the changed statuses of the plurality of playlists in step S17.

In step S18, the main control unit 101 updates the generated playlist 122. That is, the main control unit 101 registers (overwrites) the playlist 122 generated in this process in the DB 103. Incidentally, when the DB 103 is updated (when a result of determination in step S12 is YES) even in the case where the process of step S15 indicates that there is no increase or no decrease in the number of programs, at least the reproduction status or the current status or the changed status is changed, and therefore this process is performed.

After the process of step S18, or when it is determined in step S12 that the DB 103 is not updated, the process proceeds to step S19, where the main control unit 101 displays a list of playlists on the display unit 57. For example, when a plurality of playlists 122 are registered in the DB 103, the main control unit 101 arranges (lists) the plurality of playlists and displays the plurality of playlists on the display unit 57. After the process of step S19, the process is ended.

Figure 12:
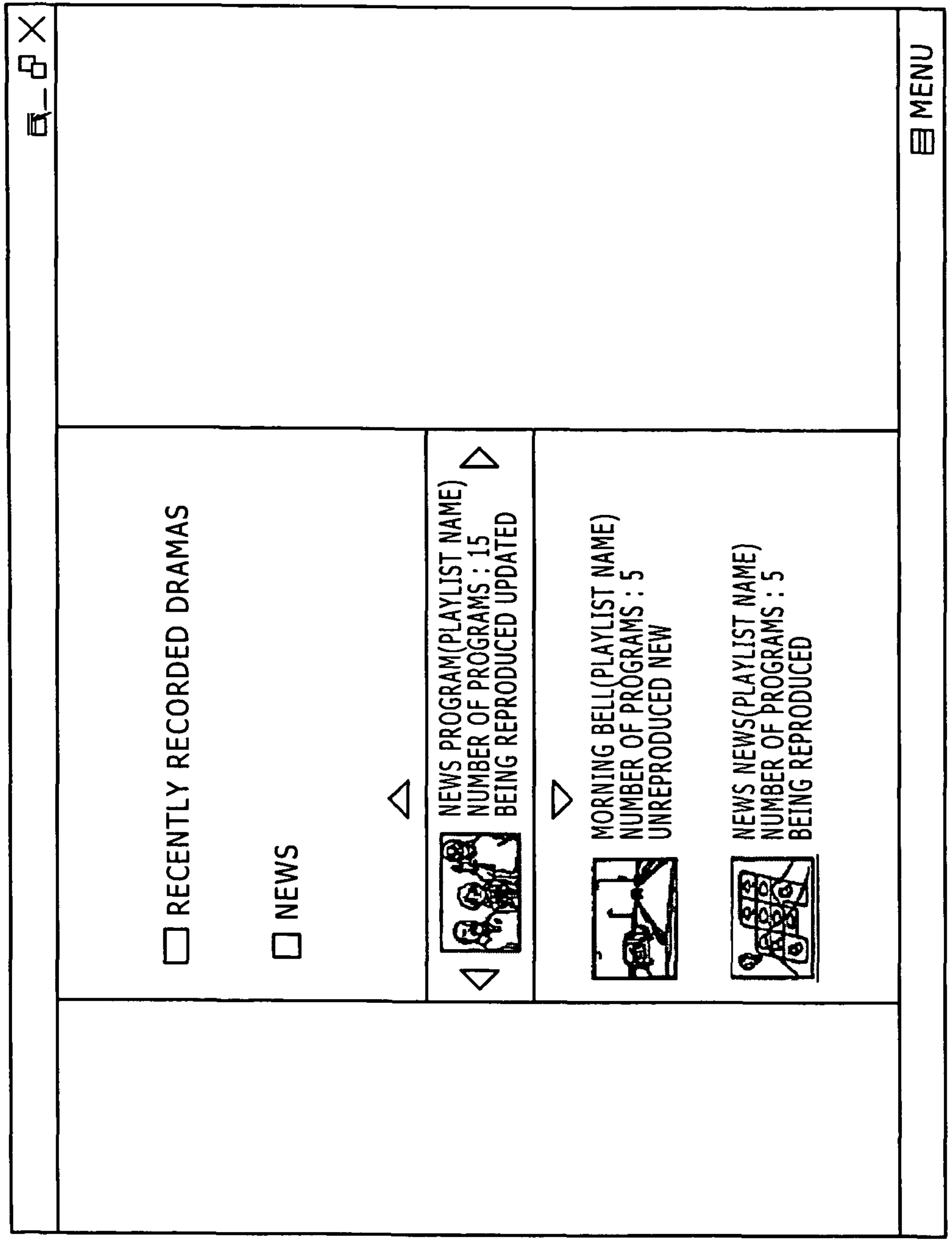
FIG. 12 is a diagram of assistance in explaining an example of a screen displayed on a display unit in FIG. 3.

FIG. 12 shows an example of a screen displayed on the display unit 57 by the process of step S19. In the example of FIG. 12, genres "recently recorded dramas" and "news" are displayed, and in the genre "news", three playlists having playlist names "news program", "morning bell", and "news news" are displayed. The playlist (one reproduction unit) having the playlist name "news program" includes 15 contents (15 programs). The current status of this playlist is "being reproduced", and the changed status of the playlist is "updated". The playlist having the playlist name "morning bell" includes five contents. The current status of this playlist is "unreproduced", and the changed status of the playlist is "new". The playlist having the playlist name "news news" includes five contents. The current status of this playlist is "being reproduced", and the changed status of the playlist is "none" ("none" means no display). Thus, series programs (for example the series programs of a news program) are grouped into one playlist and the playlist is displayed, so that a list of playlists can be presented in such a manner as to be more easily understood by the user.

Figure 10:
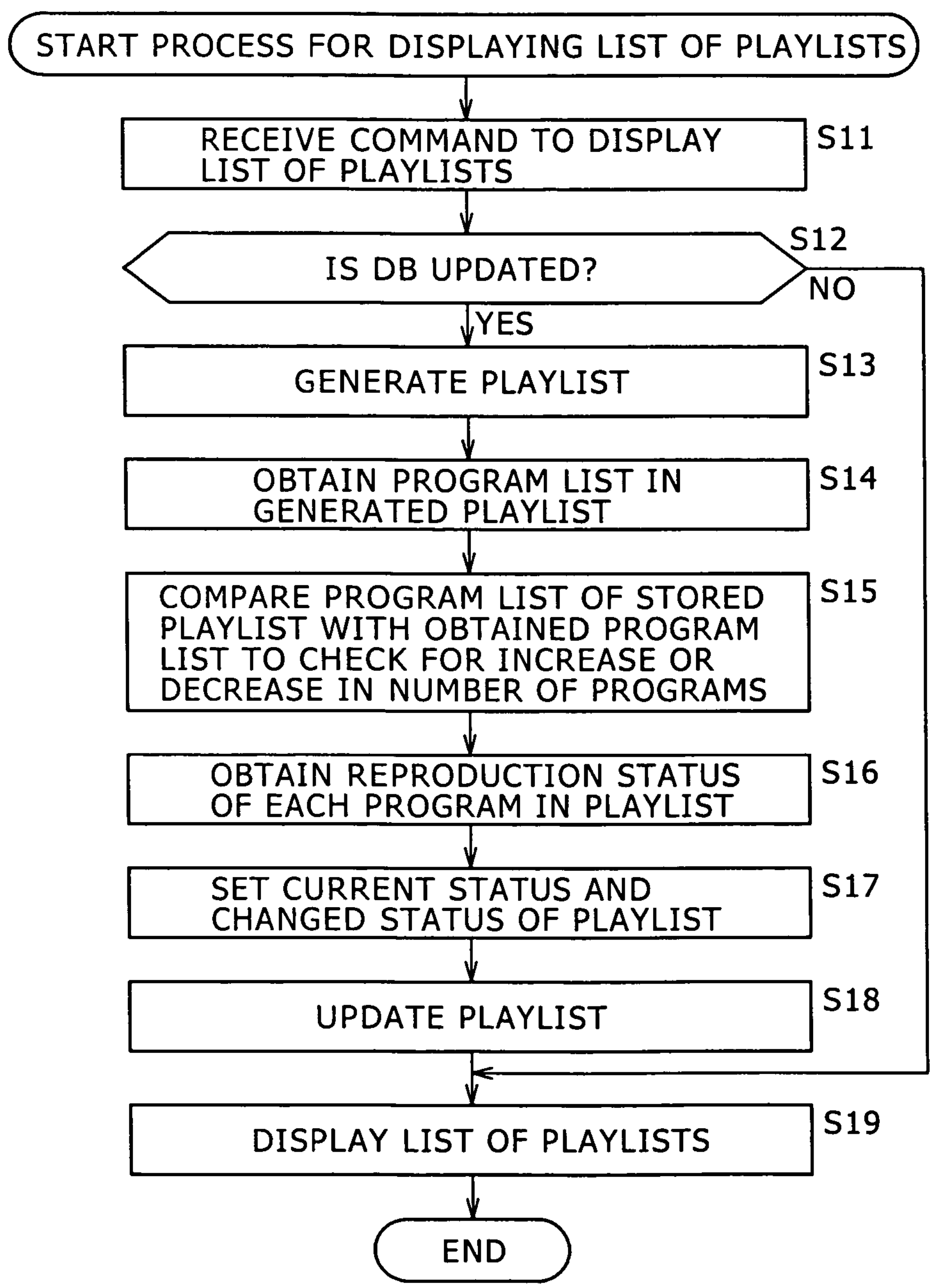
FIG. 10 is a flowchart of assistance in explaining a process for displaying a list of playlists.

As a result of the process of FIG. 10, a plurality of recorded programs can be grouped in a playlist unit. In addition, the status of the playlist is dynamically changed. Specifically, each time a list of playlists is to be displayed, a check is made for an update in the information of the DB 103, the creation of a new playlist and the updating of the current status and the changed status are performed, and the playlists are displayed. A latest status is thereby reflected in the playlist at all times, so that the user can see at a glance that a latest episode of a recorded program has been added, for example. In addition, series programs can be displayed in episode order without consideration for rebroadcasts or the like.

A process for a program will next be described with reference to a flowchart of FIG. 13. Specifically, this process is performed when a playlist is selected from a list of playlists, and a program included in (associated with) the selected playlist is reproduced or deleted. That is, the process is an example of a process performed when reproduction or deletion is performed in a program unit (reproduction in a playlist unit will be described later with reference to FIG. 15 and FIG. 16). For example, this process is performed after the process of FIG. 10 (in a state of the screen of FIG. 12 being displayed).

In step S41, the operation input unit 102 receives a playlist selection from the user. For example, the user supplies an operation input for selecting a playlist to the operation input unit 102 in a state of the screen of FIG. 12 being displayed on the display unit 57. The operation input unit 102 receives the operation input from the user, and notifies this to the main control unit 101. Suppose that for example the playlist having the playlist name "news program" is selected on the screen of FIG. 12.

In step S42, the main control unit 101 obtains a program list in the playlist (the playlist having the playlist name "news program") selected by the user in the process of step S41. For example, the program list (program list 231 in FIG. 11) is obtained from the playlist "news program" in FIG. 12.

In step S43, the main control unit 101 selects programs to be displayed on the basis of a display condition (the display condition 135 in FIG. 3). Specifically, when the meta information (the PSI and the EIT of the SI as described above) of a plurality of programs included in (associated with) one playlist has an identical episode_number, the main control unit 101 selects only a program having a smallest repeate_label as a program to be displayed. When the meta information (the PSI and the EIT of the SI as described above) of the plurality of programs has an identical start_time and an identical duration, the main control unit 101 selects only a program having a smallest service_id as a program to be displayed. When all parameters (the PSI and the EIT of the SI) of programs included in one playlist 122 are exactly the same, the main control unit 101 selects an arbitrary program as a program to be displayed.

In step S44, the order controlling unit 112 of the main control unit 101 sets the order of the programs to be displayed on the basis of the display condition (display condition 135 in FIG. 3). For example, the order controlling unit 112 rearranges the plurality of programs selected as programs to be displayed in the process of step S43 in ascending order of episode_number or in ascending order of start_time.

Figure 14:
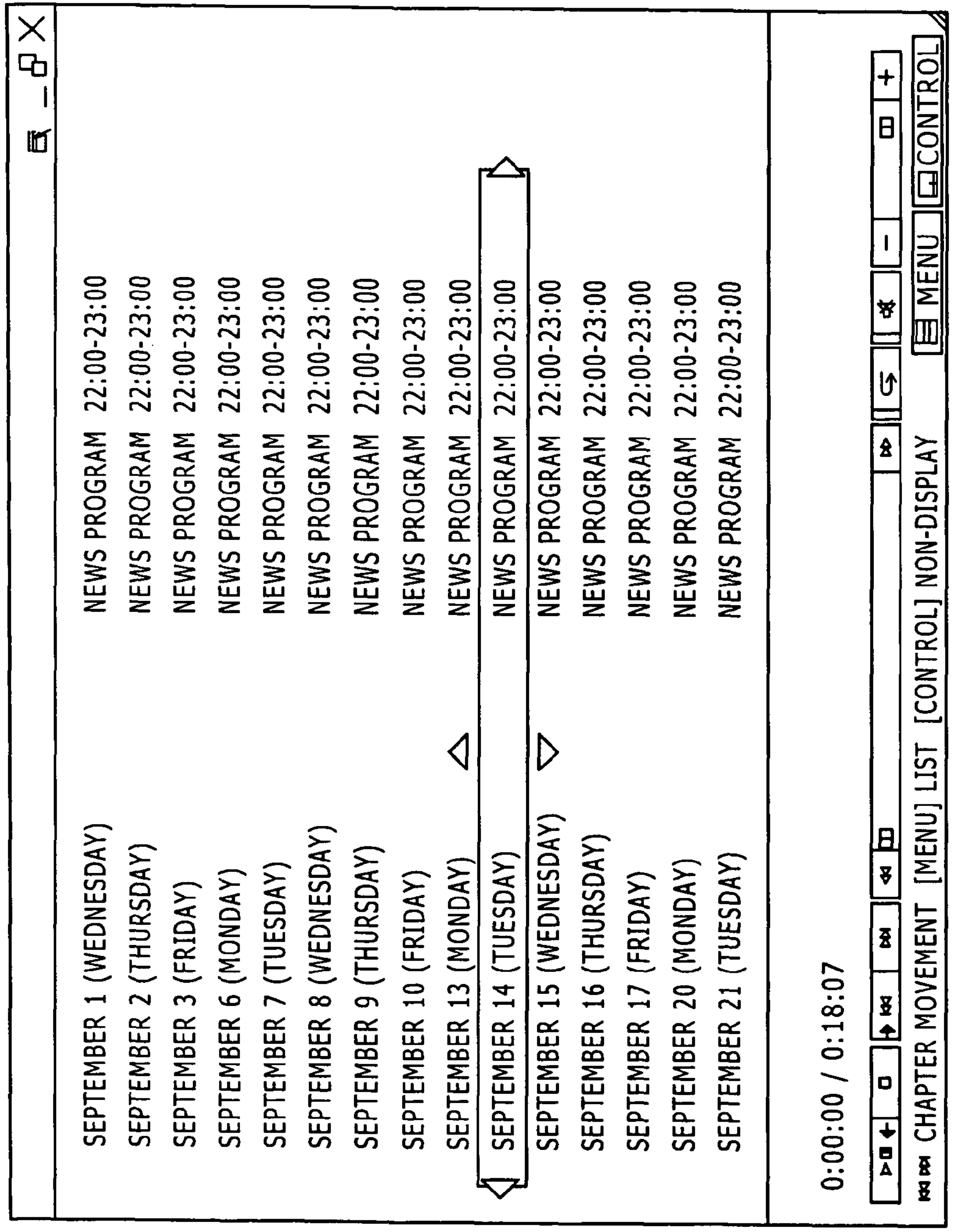
FIG. 14 is a diagram of assistance in explaining an example of a screen displayed on the display unit in FIG. 3.

In step S45, the main control unit 101 displays a list of the programs selected and rearranged by the process up to step S44 on the display unit 57. A screen as shown in FIG. 14 is thereby displayed on the display unit 57. In the example of FIG. 14, the playlist having the playlist name "news program" is selected, and 15 programs included in the "news program" are arranged in order (ascending order) of date and time. This order is a result of the rearrangement in the process of step S44.

In step S46, the operation input unit 102 receives a command to reproduce a program or a command to delete a program from the user. In this example, 15 programs included in one playlist as shown in FIG. 14 are displayed. The operation input unit 102 receives a specification of a program to be reproduced or a specification of a program to be deleted on the basis of an operation input from the user, and notifies this to the main control unit 101. Suppose that for example a news program on September 14 (Tuesday) (a program broadcast from 22:00 to 23:00) in FIG. 14 is selected as a program to be reproduced.

In step S47, the main control unit 101 performs a process based on the command received in the process of step S46. When a command to reproduce the news program on September 14 (Tuesday) (the program broadcast from 22:00 to 23:00) is received in step S46, for example, the main control unit 101 performs a process of reproducing the program. Specifically, the main control unit 101 reproduces the program by reading video information 161 (FIG. 4) included in the program information 121 of the program from the DB 103 and outputting video and audio to the display unit 57 and the speaker 58, respectively. When a command to delete the news program on September 14 (Tuesday) (the program broadcast from 22:00 to 23:00) is received in step S46, for example, the main control unit 101 deletes the program information 121 of the program from the DB 103.

In step S48, the main control unit 101 updates the status of the playlist. Specifically, the main control unit 101 updates the status of the playlist when the status is changed by the process of step S47. The updating of the status has been described above with reference to FIG. 8, and therefore detailed description thereof will be omitted. For example, when all of programs that have not yet been reproduced in the playlist are reproduced in the process of step S47, the current status is changed to a "reproduced" status.

In step S49, the main control unit 101 updates a retrieval condition, a retrieval history, and a retrieval count, and overwrites the DB 103 with the retrieval condition, the retrieval history, and the retrieval count. For example, on the basis of the meta information of the programs included in the playlist selected in the process of step S41, the main control unit 101 updates (or creates) the retrieval condition of the playlist, the retrieval history of the playlist, and the retrieval count of the playlist. The main control unit 101 converts the retrieval condition, the retrieval history, and the retrieval count into the XML format. The main control unit 101 then overwrites the DB 103 with the retrieval condition, the retrieval history, and the retrieval count as the retrieval condition 131, the retrieval history 132, and the retrieval count 133. Thereby the preference of the user is registered as the retrieval condition 131, the retrieval history 132, and the retrieval count 133. Thereafter the process is ended.

Figure 13:
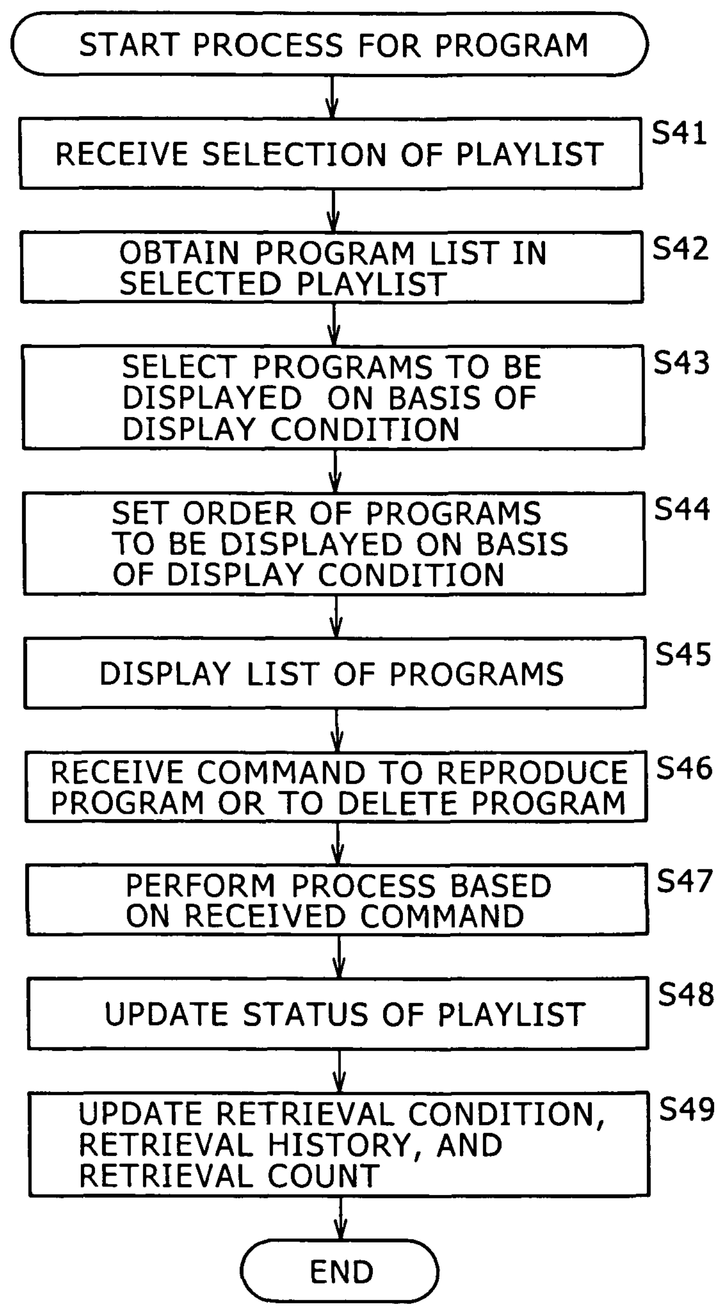
FIG. 13 is a flowchart of assistance in explaining a process for a program.

When a playlist is selected, the process of FIG. 13 rearranges a plurality of programs included in the playlist in ascending order of episode_number or in ascending order of start_time, and displays the plurality of programs. The user can therefore view the programs in order that makes viewing easier.

In addition, the process of FIG. 13 does not display all of the plurality of programs (digitally broadcast programs) included in the playlist, but displays only necessary programs on the basis of the display condition (performs the process of step S43, for example). Thus, even when a duplicate rebroadcast or the like of a program is recorded, only one program is displayed in the program list.

Further, when a command to reproduce or delete a program in the playlist is given by the user, the status of the playlist in which the program is reproduced or deleted is updated and stored (the process of step S48 is performed, for example). The status of the playlist can be used for a playlist status update when a list of playlists is to be displayed (when the process of FIG. 10 is performed, for example) next time.

Incidentally, when a plurality of programs included in one playlist include programs that are yet to be reproduced or programs that have already been reproduced, the screen of FIG. 14 may include a display to that effect.

In addition, a retrieval condition used with a high frequency in playlist retrieval may be rearranged so as to be displayed preferentially on the basis of the retrieval condition, the retrieval history, and the retrieval count, and converted into an XML format.

A reproduction process in a playlist unit will next be described with reference to flowcharts of FIG. 15 and FIG. 16. That is, while description has been made of reproduction in a program unit included in a playlist and the like in the above-described process of FIG. 13, description below will be made of reproduction in a playlist unit. Incidentally, this process is started after the above-described process of FIG. 10 (in a state of the screen of FIG. 12 being displayed).

In step S81, the operation input unit 102 receives a selection of a playlist to be reproduced from the user, and on the basis of this selection, the main control unit 101 selects the playlist to be reproduced. Suppose for example that the playlist having the playlist name "news program" in FIG. 12 is selected.

In step S82, the main control unit 101 starts the reproduction of the selected playlist.

In step S83, the main control unit 101 checks a reproduction classification. Specifically, the main control unit 101 checks whether the current status of the selected playlist is "unreproduced", "being reproduced", or "reproduced".

In step S84, the main control unit 101 determines whether the selected playlist is to be reproduced from a continuing position. For example, when a result of the check in the process of step S83 indicates that the current status of the playlist is "unreproduced" or "reproduced", the main control unit 101 determines that the selected playlist is not to be reproduced from a continuing position. When the current status of the playlist is "being reproduced", the main control unit 101 determines that the selected playlist is to be reproduced from a continuing position.

When the main control unit 101 determines in step S84 that the selected playlist is to be reproduced from a continuing position, the process proceeds to step S85, where the main control unit 101 selects a program being reproduced from a program list (program list 231 in FIG. 11) in the playlist. Incidentally, instead of selecting the program being reproduced from the program list 231 in FIG. 11, the main control unit 101 may select the program whose reproduction status is "being reproduced" from the programs 221-1 to 221-3 in FIG. 11.

In step S86, the main control unit 101 obtains a stop position at a time of previous reproduction of the selected program. Specifically, the main control unit 101 obtains a stop position at a time of previous reproduction of the program (for example the program 221-2) selected in the process of step S85 referring to the reproduction history 123 registered in the DB 103 in FIG. 3. Thus, the stop position of the program that was being reproduced previous time is registered in the reproduction history 123 registered in the DB 103 in FIG. 3.

In step S87, the main control unit 101 reproduces the program from the obtained reproduction position. Specifically, the main control unit 101 reads the program information 121 of the selected program from the obtained reproduction position, and outputs video and audio to the display unit 57 and the speaker 58.

In step S88, the main control unit 101 determines whether the reproduction of the program currently being reproduced is ended. This determination of whether the reproduction of the program currently being reproduced is ended is a determination of whether the reproduction of the program currently being reproduced among a plurality of programs included in the playlist, rather than the playlist, is ended. When the reproduction of the program currently being reproduced is not ended yet, the process stands by until the reproduction of the program currently being reproduced is ended.

When the main control unit 101 determines in step S88 that the reproduction of the program currently being reproduced is ended, the main control unit 101 in step S89 changes the program to be reproduced to a program next in order to the program that has been reproduced. For example, after the reproduction of the news program on September 14 in FIG. 14, the program to be reproduced is changed to a news program on September 15.

When the main control unit 101 determines in step S84 that the selected playlist is not to be reproduced from a continuing position, on the other hand, the main control unit 101 in step S90 selects a first program in the playlist as a program to be reproduced.

After the process of step S89 or after the process of step S90, the process proceeds to step S91, where the main control unit 101 reproduces the selected program from a start of the program. When this process is performed after the process of step S89, the reproduction is performed from a start of the program to be reproduced which program is changed in the process of step S89. When this process is performed after the process of step S90, the reproduction is performed from a start of the program selected in the process of step S90.

In step S92, the main control unit 101 determines whether the program being reproduced is a last program in the playlist. When the main control unit 101 determines that the program being reproduced is not the last program in the playlist, the process returns to step S88 to repeat the process from step S88 on down. When the main control unit 101 determines in step S92 that the program being reproduced is the last program in the playlist, the process proceeds to step S93.

In step S93, the main control unit 101 determines whether the reproduction of the program is ended. The main control unit 101 stands by until the reproduction of the program is ended. That is, the main control unit 101 stands by until the reproduction of the program currently being reproduced (the last program in the playlist) is ended. When the main control unit 101 determines in step S93 that the reproduction of the program is ended, the main control unit 101 updates the status of the playlist in step S94. For example, the main control unit 101 updates the current status of the playlist from "being reproduced" or "unreproduced" to "reproduced".

In step S95, the main control unit 101 updates the reproduction history. Specifically, the main control unit 101 writes information indicating that the reproduction of the present playlist is ended to the reproduction history 123 in the DB 103 in FIG. 3. Then the process is ended.

Figure 16:
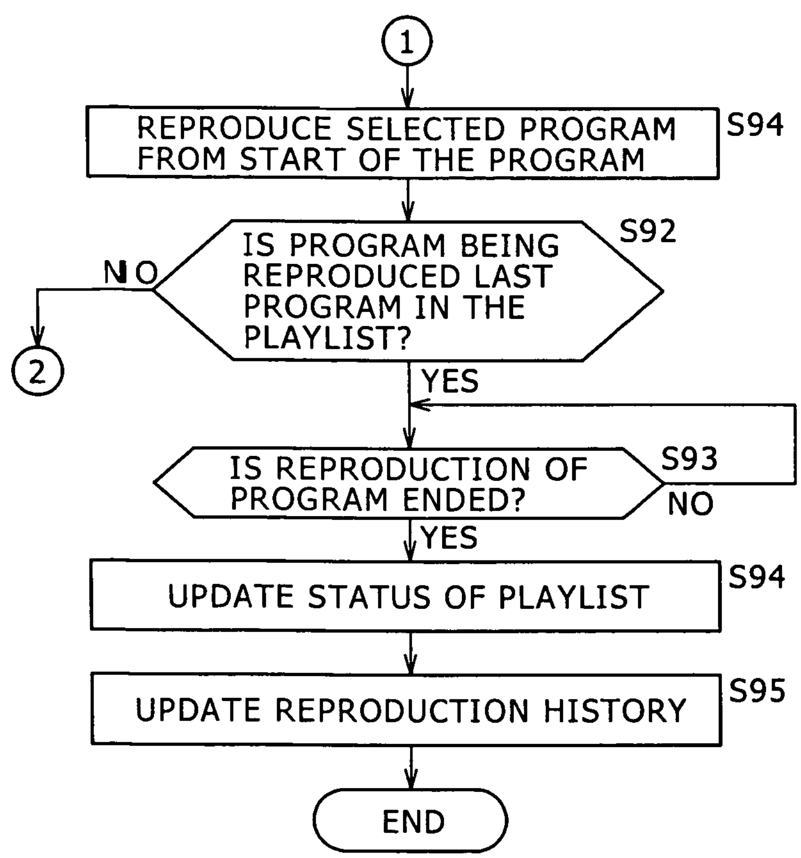
FIG. 16 is a flowchart of assistance in explaining the reproduction process in a playlist unit.

Incidentally, when a command to stop reproduction is given during the reproduction of a program in the process of FIG. 15 and FIG. 16, the reproduction history is updated accordingly, the current status of the playlist is registered as "being reproduced" (registered in the playlist of FIG. 11), and then the reproduction process is ended.

Since a reproduction process in a playlist unit is performed by the process of FIG. 15 and FIG. 16 (that is, a plurality of programs included in one playlist are reproduced continuously), the user can save the trouble of repeatedly selecting a program in the same genre, and thus reproduce programs more easily.

In addition, a stop position at a time of previous reproduction of the playlist 122 is registered as the reproduction history 123 in the DB 103. Therefore, when a command to reproduce the playlist being reproduced is given, the reproduction can be started from the stop position of the program previously being reproduced in the playlist.

As described above, a playlist for continuously reproducing a plurality of programs is generated using the meta information of the plurality of stored programs. It is therefore possible to reproduce a plurality of programs included in one playlist continuously.

In addition, since a playlist including a plurality of recorded digital broadcast programs is handled as one content, a reproduction mechanism can be provided in a form that facilitates identification by the user.

Specifically, since one playlist is formed by a plurality of recorded programs, the resume reproduction (continuous reproduction from a continuing position) of the plurality of recorded programs included in the playlist can be performed.

In addition, since the status of programs is retained, even in a case where series programs (programs belonging to one playlist) were reproduced continuously, and the reproduction was stopped at a midpoint, reproduction can be resumed from the position where the reproduction was stopped when the continuous reproduction of the series programs is restarted. Thus the user can perform the reproduction more smoothly.

Further, in a case where the playlist itself is reproduced, after an end of reproduction of one program, a program sorted as a next program is reproduced, and reproduction is stopped when the reproduction of a last program is ended. Thus one playlist can be treated as if the playlist were one content.

In addition, instead of performing recording after selection by the user, programs are recorded in advance, and programs to be reproduced can be selected from the recorded programs. Therefore the user can view desired programs more easily without a need to think about the broadcast dates and times of the desired programs or the like.

Further, the playlist generation processing unit 111 generates a playlist 122, and on the basis of the playlist, a plurality of programs are handled as one content (program). Thus, in a case of a serial drama, for example, installments from a first episode to a last episode can be listed and grouped into one, so that continuous reproduction of the program can be readily performed.

In addition, the playlist generation processing unit 111 generates the playlist 122 on the basis of the meta information 162 of the program information and the like. Thus, even when there is a change in a broadcast channel or a news program is inserted during the broadcast of a baseball relay program, for example, data unrelated to the program is removed, and thus the baseball relay can be reproduced continuously. That is, the user can reproduce the program without caring about a change in the channel, a temporary interruption of the program, or the like.

Further, since a retrieval condition for contents is defined in an XML format, the retrieval condition can be changed or added easily.

Incidentally, an AND/OR set of meta information used to filter contents by the user may be registered in the retrieval condition 131 in the DB 103, and thus added as a new filter (retrieval condition).

In addition, the broadcasting station 11 or the like may notify a recommended meta information parameter or parameter set to the personal computer 12, and the personal computer 12 may register the notified meta information parameter or parameter set in the retrieval condition 131.

Further, rather than recording programs on the basis of preferences of the user and reproducing the programs, it is possible to generate a playlist so as to present programs desired by the user among already recorded programs to the user.

Incidentally, in the above example, programs are grouped into one playlist on the basis of the meta information of program information when there is relativity in the meta information (matching of a retrieval condition). However, when a plurality of programs included in one playlist do not have an order system, the programs may be separated individually so as not to be grouped into one playlist.

For example, when a playlist is a list by series, a plurality of programs included in the playlist are reproduced continuously. When a playlist is a list by director or performer, programs in a same series in the playlist are continuously reproduced in order.

Further, the order of the plurality of programs included in the playlist, a program the reproduction of which was stopped, and a stop position of the program are stored, and when a command for reproduction is given later, reproduction is performed from the stop position of the program the reproduction of which was stopped.

In addition, while in the above example, description has been made of a case where the personal computer 12 performs processes, the present invention is also applicable to information processing apparatuses and reproducing apparatuses that record or reproduce contents.

The series of processes described above can be carried out not only by hardware but also by software. When the series of processes is to be carried out by software, a program constituting the software is installed from a network or a recording medium.

As shown in FIG. 2, the recording medium is not only formed by a packaged medium distributed to users to provide the program separately from the computer and having the program recorded thereon, the packaged medium including the removable medium 81, but also formed by the ROM 52, a hard disk included in the storage unit 59, or the like where the program is recorded and which is provided to the user in a state of being preincorporated in the apparatus proper.

It is to be noted that in the present specification, the steps describing the computer program include not only processes carried out in time series in the described order but also processes carried out in parallel or individually and not necessarily in time series.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus for processing program information as information of programs, the information processing apparatus comprising:

a storing section operable to store the program information and playlist information;

a playlist generating section operable to generate a playlist by grouping a plurality of pieces of the stored program information based on information descriptive of the stored program information, the descriptive information being included in the program information, and by associating the plurality of pieces of program information having a same descriptive information with one list for associating the plurality of the grouped pieces of program information with each other and reproducing the plurality of the grouped pieces of program information, wherein each playlist generated by the playlist generating section is stored in the storing section as the playlist information; and a display controlling section operable to control display of an image based on the playlist, the image allowing selection of the playlist;

wherein the playlist generating section generates the playlist by further including, in the playlist, first status information indicating a reproduction status of the playlist as a whole and second status information indicating an update status of the plurality of pieces of program information corresponding to the playlist, the reproduction status of the playlist as a whole being one of (i) an unreproduced status, (ii) a being reproduced status, and (iii) a reproduced status, in which the reproduction status of the playlist is the unreproduced status when none of the plurality of pieces of program information of the playlist have been reproduced, the reproduction status of the playlist is the being reproduced status when one or more of the plurality of pieces of program information of the playlist have not been reproduced and the reproduction status is not the unreproduced status, and the reproduction status of the playlist is the reproduced status when all of the plurality of pieces of program information of the playlist have been reproduced, and the update status being one of (i) a new status, (ii) an updated status, and (iii) a none status, in which the update status of the playlist is the new status when none of the plurality of pieces of program information of the playlist have been reproduced after the playlist is created, the update status of the playlist is the updated status when contents of the playlist have been updated and none of the plurality of pieces of program information of the playlist have been reproduced, and the update status of the playlist is the none status when the status is not the new status or the updated status, in which only a number of predetermined combinations of the reproduction status and the update status are available which is less than a total number of combinations of the reproduction status and the update status such that three combinations which include a first combination wherein the reproduction status is unreproduced and the update status is none, a second combination wherein the reproduction status is being reproduced and the update status is new, and a third combination wherein the reproduction status is reproduced and the update status is new are unavailable, and the display controlling section controls the display of the image to enable information representing a current reproduction status of the playlist and the update status, and the same descriptive information associated with the plurality of pieces of program information corresponding to the playlist, to be displayed at the same time on a display screen for viewing by an operator such that, when a plurality of playlists are stored in the storing section as the playlist information in which the stored playlists correspond to respective same descriptive information, the information actually displayed on the display screen includes the respective same descriptive information displayed as a list and, in one of the same descriptive information in the list, the playlists having the same descriptive information that is same as the one of the same descriptive information, and specifically indicates, for each of the playlists displayed in the one of the same descriptive information in the list, (i) whether the current reproduction status is the unreproduced status, the being reproduced status, or the reproduced status and (ii) whether the update status pertaining to the current reproduction status is the new status or the updated status, and such that when the update status is the none status no actual display thereof is provided on the display screen.

2. The information processing apparatus as claimed in claim 1, further comprising a sorting section operable to change an order of the plurality of pieces of program information corresponding to the playlist based on the descriptive information of each of the plurality of pieces of program information corresponding to the playlist, wherein, when a command is given to display the plurality of pieces of program information corresponding to the playlist, the display controlling section controls the display of an image based on the program information, the image allowing a command to be given to reproduce the program information in the order of the plurality of pieces of program information, the order being changed by the sorting section.

3. The information processing apparatus as claimed in claim 1, further comprising:

an operation input receiving section operable to receive an operation input for selecting the playlist from a user; and a storing controlling section operable to control storage in the storing section of a retrieval condition representing a condition for selecting the playlist, a retrieval history representing a history of retrieval of the playlist, and a retrieval count representing a number of retrievals of the playlist based on the descriptive information of each of the plurality of pieces of program information corresponding to the playlist selected by the operation input;

wherein the playlist generating section generates the playlist based on the retrieval condition, the retrieval history, the retrieval count and the descriptive information of the program information stored in the storing section.

4. The information processing apparatus as claimed in claim 3, wherein the storing controlling section converts the retrieval condition, the retrieval history, and the retrieval count into an XML (Extensible Markup Language) format, and stores the retrieval condition, the retrieval history, and the retrieval count in the storing section.

5. The information processing apparatus as claimed in claim 1, further comprising a reproducing section operable to continuously reproduce the plurality of pieces of program information corresponding to the playlist.

6. An information processing method, comprising:

storing program information as information of programs, and playlist information as information of playlists;

generating a playlist by grouping a plurality of pieces of the stored program information based on information descriptive of the stored program information, the descriptive information being included in the program information, and by associating the plurality of pieces of program information having a same descriptive information with one list for associating the plurality of the grouped pieces of program information with each other and reproducing the plurality of the grouped pieces of program information, wherein each playlist generated is stored as the playlist information; and controlling display of an image based on the playlist, the image allowing selection of the playlist;

wherein the playlist generating step includes generating the playlist by further including, in the playlist, first status information indicating a reproduction status of the playlist as a whole and second status information indicating an update status of the plurality of pieces of program information corresponding to the playlist, the reproduction status of the playlist as a whole being one of (i) an unreproduced status, (ii) a being reproduced status, and (iii) a reproduced status, in which the reproduction status of the playlist is the unreproduced status when none of the plurality of pieces of program information of the playlist have been reproduced, the reproduction status of the playlist is the being reproduced status when one or more of the plurality of pieces of program information of the playlist have not been reproduced and the reproduction status is not the unreproduced status, and the reproduction status of the playlist is the reproduced status when all of the plurality of pieces of program information of the playlist have been reproduced, and the update status being one of (i) a new status, (ii) an updated status, and (iii) a none status, in which the update status of the playlist is the new status when none of the plurality of pieces of program information of the playlist have been reproduced after the playlist is created, the update status of the playlist is the updated status when contents of the playlist have been updated and none of the plurality of pieces of program information of the playlist have been reproduced, and the update status of the playlist is the none status when the status is not the new status or the updated status, in which only a number of predetermined combinations of the reproduction status and the update status are available which is less than a total number of combinations of the reproduction status and the update status such that three combinations which include a first combination wherein the reproduction status is unreproduced and the update status is none, a second combination wherein the reproduction status is being reproduced and the update status is new, and a third combination wherein the reproduction status is reproduced and the update status is new are unavailable, and the display controlling step includes controlling the display of the image to enable information representing a current reproduction status of the playlist and the update status, and the same descriptive information associated with the plurality of pieces of program information corresponding to the playlist, to be displayed at the same time on a display screen for viewing by an operator such that, when a plurality of playlists are stored as the playlist information in which the stored playlists correspond to respective same descriptive information, the information actually displayed on the display screen includes the respective same descriptive information displayed as a list and, in one of the same descriptive information in the list, the playlists having the same descriptive information that is same as the one of the same descriptive information, and specifically indicates, for each of the playlists displayed in the one of the same descriptive information in the list, (i) whether the current reproduction status is the unreproduced status, the being reproduced status, or the reproduced status and (ii) whether the update status pertaining to the current reproduction status is the new status or the updated status, and such that when the update status is the none status no actual display thereof is provided on the display screen.

7. A non-transitory computer readable medium having stored thereon a program for making a computer perform an information processing method, the method comprising:

storing program information as information of programs, and playlist information as information of playlists;

generating a playlist by grouping a plurality of pieces of the stored program information based on information descriptive of the stored program information, the descriptive information being included in the program information, and by associating the plurality of pieces of program information having a same descriptive information with one list for associating the plurality of the grouped pieces of program information with each other and reproducing the plurality of the grouped pieces of program information, wherein each playlist generated is stored as the playlist information; and controlling display of an image based on the playlist, the image allowing selection of the playlist;

wherein the playlist generating step includes generating the playlist by further including, in the playlist, first status information indicating a reproduction status of the playlist as a whole and second status information indicating an update status of the plurality of pieces of program information corresponding to the playlist, the reproduction status of the playlist as a whole being one of (i) an unreproduced status, (ii) a being reproduced status, and (iii) a reproduced status, in which the reproduction status of the playlist is the unreproduced status when none of the plurality of pieces of program information of the playlist have been reproduced, the reproduction status of the playlist is the being reproduced status when one or more of the plurality of pieces of program information of the playlist have not been reproduced and the reproduction status is not the unreproduced status, and the reproduction status of the playlist is the reproduced status when all of the plurality of pieces of program information of the playlist have been reproduced, and the update status being one of (i) a new status, (ii) an updated status, and (iii) a none status, in which the update status of the playlist is the new status when none of the plurality of pieces of program information of the playlist have been reproduced after the playlist is created, the update status of the playlist is the updated status when contents of the playlist have been updated and none of the plurality of pieces of program information of the playlist have been reproduced, and the update status of the playlist is the none status when the status is not the new status or the updated status, in which only a number of predetermined combinations of the reproduction status and the update status are available which is less than a total number of combinations of the reproduction status and the update status such that three combinations which include a first combination wherein the reproduction status is unreproduced and the update status is none, a second combination wherein the reproduction status is being reproduced and the update status is new, and a third combination wherein the reproduction status is reproduced and the update status is new are unavailable, and the display controlling step includes controlling the display of the image to enable information representing a current reproduction status of the playlist and the update status, and the same descriptive information associated with the plurality of pieces of program information corresponding to the playlist, to be displayed at the same time on a display screen for viewing by an operator such that, when a plurality of playlists are stored as the playlist information in which the stored playlists correspond to respective same descriptive information, the information actually displayed on the display screen includes the respective same descriptive information displayed as a list and, in one of the same descriptive information in the list, the playlists having the same descriptive information that is same as the one of the same descriptive information, and specifically indicates, for each of the playlists displayed in the one of the same descriptive information in the list, (i) whether the current reproduction status is the unreproduced status, the being reproduced status, or the reproduced status and (ii) whether the update status pertaining to the current reproduction status is the new status or the updated status, and such that when the update status is the none status no actual display thereof is provided on the display screen.

8. The information processing apparatus as claimed in claim 1, wherein the same descriptive information is genre.

* * * * *